US012506271B2

(12) United States Patent
Chen et al.

(10) Patent No.: US 12,506,271 B2
(45) Date of Patent: Dec. 23, 2025

(54) HORIZONTALLY POLARIZED OMNIDIRECTIONAL MULTI-BAND ANTENNA STRUCTURE

(71) Applicant: Alpha Networks Inc., Hsinchu (TW)

(72) Inventors: Guan-Ting Chen, Hsinchu (TW); Kuang-Wei Lin, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 56 days.

(21) Appl. No.: 18/666,775

(22) Filed: May 16, 2024

(65) Prior Publication Data

US 2025/0239779 A1 Jul. 24, 2025

(30) Foreign Application Priority Data

Jan. 24, 2024 (TW) ................................ 113102799

(51) Int. Cl.
*H01Q 13/08* (2006.01)
*H01Q 5/50* (2015.01)

(52) U.S. Cl.
CPC ............... *H01Q 13/08* (2013.01); *H01Q 5/50* (2015.01)

(58) Field of Classification Search
CPC .......... H01Q 13/08; H01Q 5/50; H01Q 5/364; H01Q 1/2291; H01Q 21/205; H01Q 9/42
See application file for complete search history.

(56) References Cited

U.S. PATENT DOCUMENTS

2001/0050638 A1 12/2001 Ishitobi
2004/0108964 A1 6/2004 McKivergan
2017/0033471 A1* 2/2017 Huang ................ H01Q 1/2291

FOREIGN PATENT DOCUMENTS

CN 213403085 U 6/2021
CN 116995416 A 11/2023
TW 201705614 A 2/2017
TW 1675508 B * 10/2019 ........... H01Q 25/001
TW I675508 B 10/2019
TW 202213866 A 4/2022

* cited by examiner

*Primary Examiner* — Seokjin Kim
(74) *Attorney, Agent, or Firm* — CIPO IP Group

(57) ABSTRACT

A horizontally polarized omnidirectional multi-band antenna structure includes a substrate and two structurally-symmetric radiators, each being provided on a layout area on one of the two opposite sides of the substrate, and including a X-shaped primary microstrip line, four secondary microstrip lines, four primary stubs, four secondary stubs and four resonators. The primary microstrip line has four end points arranged with the secondary microstrip lines along different extending directions. The primary stubs extend along different directions from four sections of the primary microstrip line. Each secondary microstrip line is provided with one of the secondary stubs. Resonators are provided between four end points of the primary microstrip line and the primary stubs. The antenna structure supports WiFi 6E/WiFi 7 frequency bands including the 2 GHz, 5 GHz and 6 GHz bands, has characteristics of horizontal polarization and omnidirectionality, and effectively satisfies the needs for miniaturized multi-band and wide band antennas.

8 Claims, 6 Drawing Sheets

HORIZONTALLY POLARIZED OMNIDIRECTIONAL MULTI-BAND ANTENNA STRUCTURE

CROSS-REFERENCE TO RELATED PATENT APPLICATION

This non-provisional application claims priority to and the benefit of, under 35 U.S.C. § 119 (a), Taiwan Patent Application No. 113102799, filed Jan. 24, 2024 in Taiwan. The entire content of the above identified application is incorporated herein by reference.

FIELD

The present disclosure relates to an antenna structure, and more particularly to a horizontally polarized omnidirectional multi-band antenna structure having two structurally-symmetric radiators, each being approximately X-shaped and having multiple stubs, so as to create a required resonance current path.

BACKGROUND

Some wireless equipment uses a horizontally polarized single-band PCB antenna together with a metal antenna. Such an antenna design can provide stable signal coverage in a specific frequency band and achieve relatively good antenna isolation through its physical structure. However, with the evolution of WiFi technologies (e.g., from WiFi 1 in the early days to the advent of WiFi 6E and the deployment of WiFi 7) bearing witness to a dramatic increase in wireless data transfer speed and to the gradual release of frequency bands, wireless equipment that supports only a single band is obviously unable to meet the needs of the general public. More particularly, the antenna design of a piece of wireless equipment nowadays may have to cover the 2.4 GHz band, the 5 GHz band, and the new 6 GHz band at the same time. The foregoing circumstances have without doubt posed great challenges to the multifunctionality, compactness, and band coverage of antenna designs.

Generally, a piece of wireless equipment that is required to support multiple frequency bands must use multiple antennas to support different bands. This not only causes an increase in cost, but also complicates the antenna design. Multi-band antennas, therefore, have become an attractive alternative. A multi-band antenna is so designed that it allows a single antenna structure to operate in multiple bands at the same time. This design can greatly reduce the number of the antennas required in a piece of wireless equipment, thereby reducing the cost of and the space occupied by the equipment, which is of paramount importance where available space is limited and where cost is strictly controlled. Nevertheless, designing a horizontally polarized omnidirectional antenna structure that can operate in the new 6 GHz band as well as the 2.4 GHz and 5 GHz bands is extremely challenging, mainly because according to the theories of electromagnetism the size of an antenna is related to the operating wavelengths of the antenna. Therefore, in order for an antenna to work effectively at a low frequency (e.g., 2.4 GHz), the size of the antenna must match the corresponding and relatively greater wavelength and hence be relatively large, but as the operating frequency increases (i.e., corresponds to a shorter wavelength), the overall size of the antenna can be reduced. This gives rise to a paradox in design of enabling an antenna to cover multiple bands or a wide band while staying compact in size.

In view of the above, one of the issues addressed in the present disclosure is to design a multi-band antenna structure so as to support plural operating frequency bands, such as frequency bands of 2.4 GHz, 5 GHz and 6 GHZ, without greatly increasing its size.

SUMMARY

WiFi technology has had a central role during the development process of modern wireless communication technology. Accordingly, in order to support the development of WiFi 6E products and achieve size miniaturization and cost reduction while ensuring antenna performance and coverage, based on years of extensive practical experience in professional antenna design and the research spirit for excellence, and as a result of longtime labored research and experiment, a horizontally polarized omnidirectional multi-band antenna structure is provided in the present disclosure, so as to provide the public with better products and usage experience.

Certain aspects of the present disclosure are directed to a horizontally polarized omnidirectional multi-band antenna structure. The antenna structure includes a substrate, a first radiator and a second radiator. One side of the substrate has a first layout area having a square shape or a substantially square shape, and the other side of the substrate has a second layout area corresponding in position to the first layout area. The first radiator is disposed on the substrate and located in the first layout area, and includes a first primary microstrip line, four first secondary microstrip lines, four first primary stubs, four first secondary stubs and four first resonators. The first primary microstrip line is X-shaped and has four sections and a central intersection that can be a feed point. Each of the four sections extends from the central intersection toward one of four corners of the first layout area, and has an end point that is located away from the central intersection and is substantially located at a corresponding corner of the first layout area. Each of the four first secondary microstrip lines has a first end connected to a corresponding end point of the first primary microstrip line, extends along an edge of the first layout area to a second end opposite to the first end, and forms a first surrounded space with two of the four sections that correspond to the first end and the second end, respectively. The first secondary microstrip lines extend along different directions. Each of the four first primary stubs extends from one of the four sections of the first primary microstrip line. The first primary stubs are located in different first surrounded spaces formed by the four first secondary microstrip lines and the four sections. The four first secondary stubs are located in the different first surrounded spaces formed by the four first secondary microstrip lines and the four sections. Each of the four first secondary stubs extends from one of the first secondary microstrip lines and is in the same one of the first surrounded spaces with a corresponding one of the first primary stubs without contacting the corresponding first primary stub. The four first resonators are provided at the four sections of the first primary microstrip line, respectively. Each of the four first resonators has an octagonal shape, and is located between an end point of a corresponding one of the sections where the first resonator is provided and a corresponding one of the first primary stubs that extends from the corresponding section. The second radiator is disposed on the substrate, located in the second layout area and structurally symmetric to the first radiator, and includes a second primary microstrip line, four second secondary microstrip lines, four second primary stubs, four second secondary stubs and four second resonators. The second primary microstrip line is X-shaped and has four sections and a central intersection that can be a grounding point. Each of the four sections of the second primary microstrip line extends from the central intersection of the second primary microstrip line toward one of four corners of the second layout area, and has an end point that is located away from the central intersection of the second primary microstrip line and is substantially located at a corresponding corner of the second layout area. The central intersection of the second primary microstrip line corresponds in position to the central intersection of the first primary microstrip line. Each of the four second secondary microstrip lines has a first end connected to a corresponding end point of the second primary microstrip line, extends along an edge of the second layout area to a second end opposite to the first end of the second secondary microstrip line, and forms a second surrounded space with two of the four sections of the second primary microstrip line that correspond to the first end and the second end of the second secondary microstrip line, respectively. The second secondary microstrip lines extend along different directions. Each of the four second primary stubs extends from one of the four sections of the second primary microstrip line. The second primary stubs are located in different second surrounded spaces formed by the four second secondary microstrip lines and the four sections of the second primary microstrip line. The four second secondary stubs are located in the different second surrounded spaces formed by the four second secondary microstrip lines and the four sections of the second primary microstrip line. Each of the four second secondary stubs extends from one of the second secondary microstrip lines and is in the same one of the second surrounded spaces with a corresponding one of the second primary stubs without contacting the corresponding second primary stub. The four second resonators are provided at the four sections of the second primary microstrip line, respectively. Each of the four second resonators has an octagonal shape, and is located between an end point of a corresponding one of the sections of the second primary microstrip line where the second resonator is provided and a corresponding one of the second primary stubs that extends from the corresponding section of the second primary microstrip line. Accordingly, the multi-band antenna structure can support WiFi 6E/WiFi 7 frequency bands including 2 GHz, 5 GHZ and 6 GHz bands, has characteristics of horizontal polarization and omnidirectionality, and effectively satisfies the needs for miniaturized multi-band and wide band antennas.

In certain embodiments, each of the first layout area and the second layout area has a square shape or a substantially square shape.

In certain embodiments, the projection of the first layout area on the other side of the substrate that is provided with the second layout area and the second layout area coincide or substantially coincide.

In certain embodiments, each two adjacent sections of the four sections of the first primary microstrip line are perpendicular to each other.

In certain embodiments, an extending direction of each of the first primary stubs is perpendicular to an extending direction of a corresponding one of the sections of the first primary microstrip line where the first primary stub is connected.

In certain embodiments, the length of each of the second resonators along an extending direction of one of the sections of the second primary microstrip line that corresponds to the second resonator is greater than the length of one of the first resonators that corresponds to the second resonator along an extending direction of one of the sections of the first primary microstrip line that corresponds to the first resonator.

In certain embodiments, the horizontally polarized omnidirectional multi-band antenna structure operates at 2G, 5G, and 6G frequency bands.

In certain embodiments, the X-axis, Y-axis, and Z-axis dimensions of the horizontally polarized omnidirectional multi-band antenna structure are 0.3λ, 0.3λ, and 0.006%, respectively.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
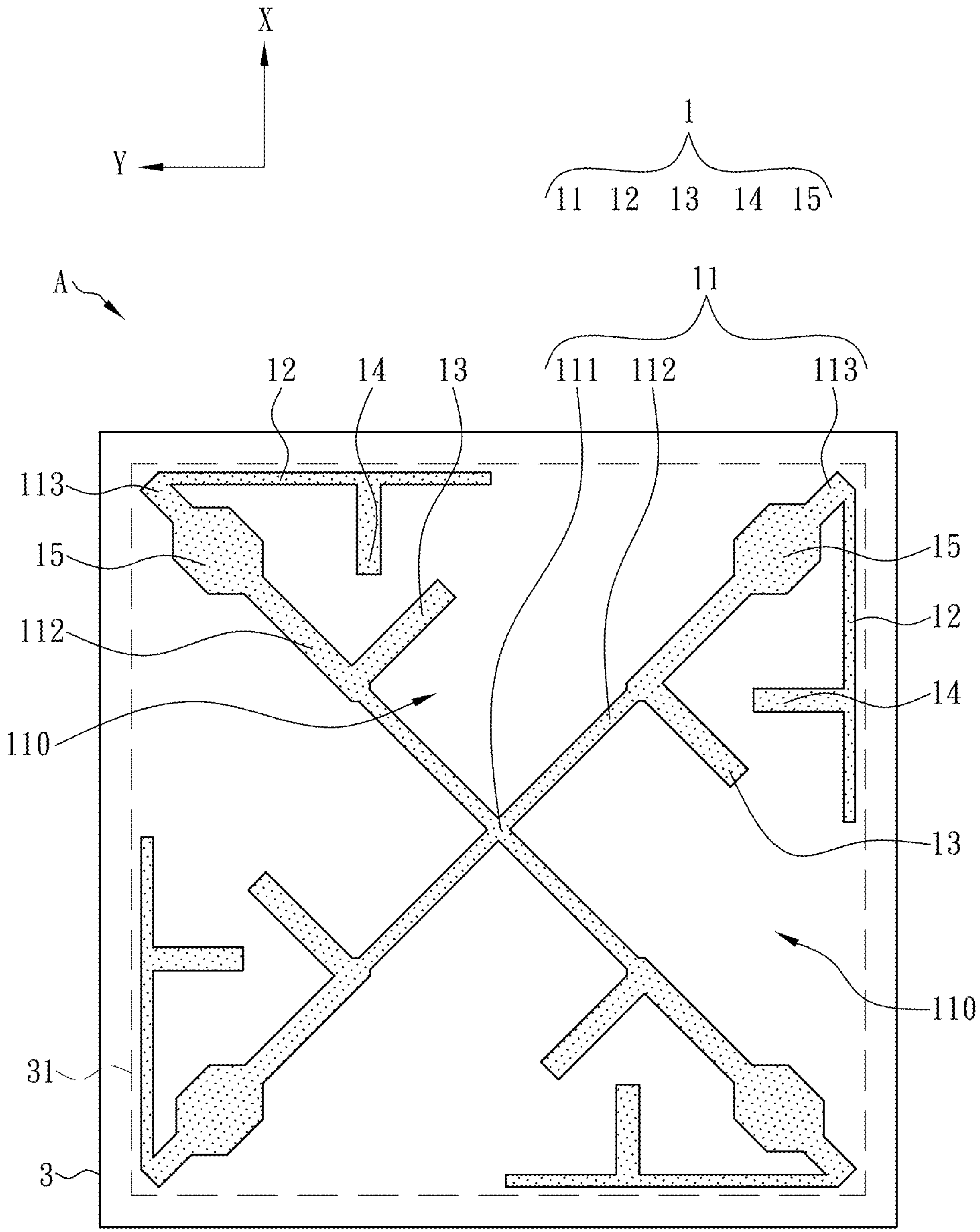
FIG. 1 is a top view of an antenna structure according to certain embodiments in the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The accompanying drawings are schematic and may not have been drawn to scale. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like. Directional terms (e.g., "front", "rear", "left", "right", "upper/top" and/or "lower/bottom") are explanatory only and are not intended to be restrictive of the scope of the present disclosure. As used herein, the term "substantially", "approximately", etc. refers to, for example, a value, or an average of values, in an acceptable deviation range of a particular value recognized or decided by a person of ordinary skill in the art, taking into account any specific quantity of errors related to the measurement of the value that may resulted from limitations of a measurement system or device. For example, "substantially" may indicate that the value is within, for example, ±5%, ±3%, ±1%, ±0.5% or ±0.1%, or one or more standard deviations, of the particular value.

Certain aspects of the present disclosure are directed to a horizontally polarized omnidirectional multi-band antenna structure. In certain embodiments, referring to FIG. 1 and FIG. 2, the multi-band antenna structure A includes a first radiator 1, a second radiator 2, and a substrate 3. The substrate 3 (e.g., a printed circuit board) is used to carry the first radiator 1 and the second radiator 2, and the carrying mechanism includes but is not limited to the substrate 3 being printed with the radiators, being etched to form the radiators, being attached with the radiators, etc. One side (e.g., the front side) of the substrate 3 has a first layout area 31. The first layout area 31 has a square shape or a substantially square shape and is where the first radiator 1 is located. In other words, the first layout area 31 is approximately the area taken up by the first radiator 1. The other side (e.g., the backside) of the substrate 3 has a second layout area 32. The second layout area 32 has a square shape or a substantially square shape and is where the second radiator 2 is located. In other words, the second layout area 32 is approximately the area taken up by the second radiator 2. The first layout area 31 and the second layout area 32 correspond in position to each other. That is to say, a projection of the first layout area 31 on the other side of the substrate 3 that has the second layout area 32 and the second layout area 32 coincide or substantially coincide, and a projection of the second layout area 32 on the side of the substrate 3 that has the first layout area 31 and the first layout area 31 coincide or substantially coincide.

Figure 2:
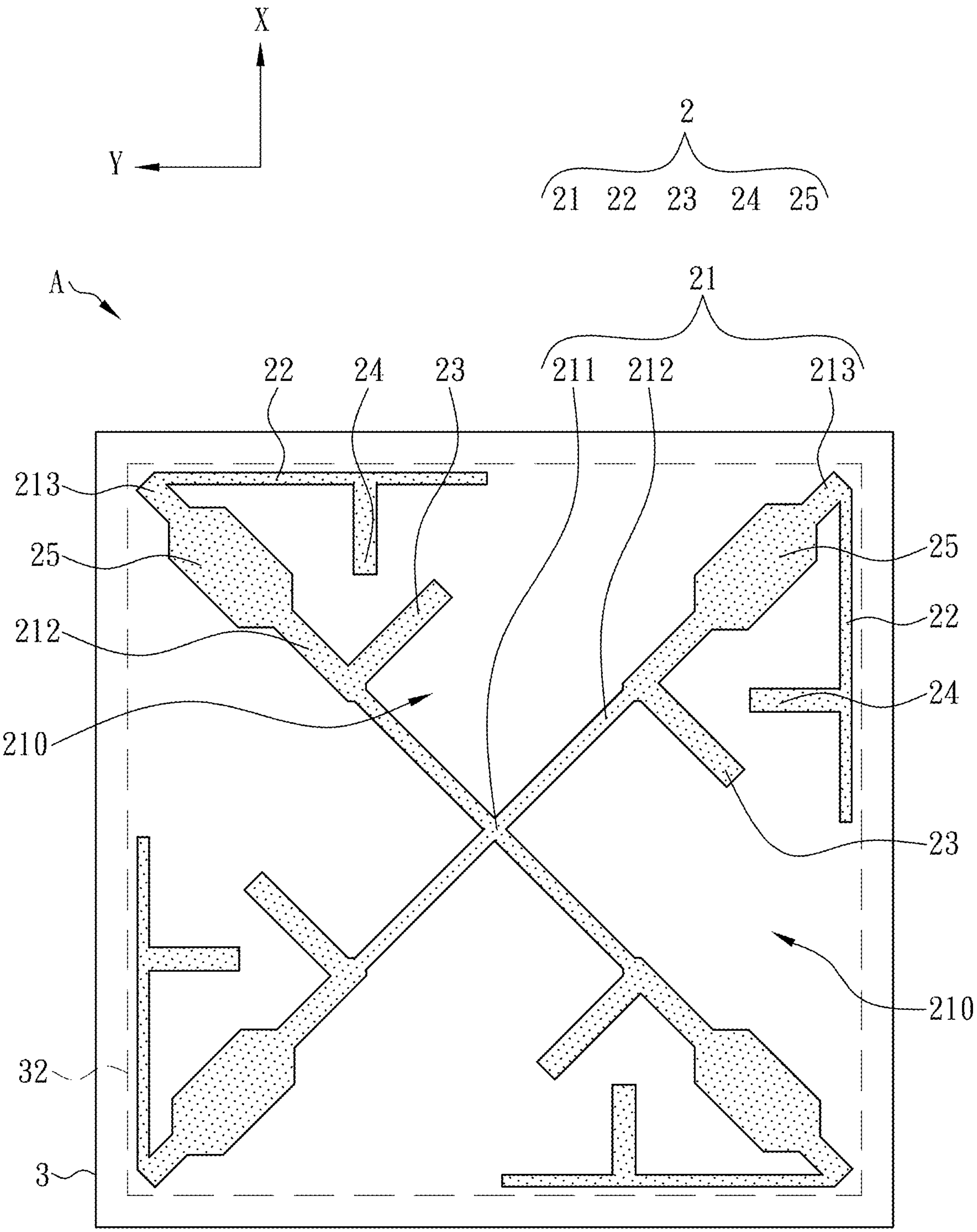
FIG. 2 is a bottom view of the antenna structure according to certain embodiments in the present disclosure.

In certain embodiments, with continued reference to FIG. 1 and FIG. 2, the multi-band antenna structure A can be a three-band structure supporting the following frequency bands of WiFi 6E/7: the 2G band (2.4 GHz-2.5 GHZ), the 5G band (5.15 GHz-5.85 GHZ), and the 6G band (5.925 GHZ-7.125 GHZ). Therefore, the first layout area 31 where the first radiator 1 is provided can have a length of 0.3λ in the X-axis direction, with the wavelength (λ) being approximately 125 mm when the lowest operating frequency is 2.4 GHz. Accordingly, the first layout area 31 can have a length of 38 mm in the X-axis direction. The length of the first layout area 31 in the Y-axis direction is also 0.3λ and is accordingly also approximately 38 mm. The second layout area 32 where the second radiator 2 is provided can have the same dimensions as the first layout area 31.

In certain embodiments, with continued reference to FIG. 1 and FIG. 2, the first radiator 1 includes metal microstrip lines and is integrally formed. The first radiator 1 can be divided into a first primary microstrip line 11, four first secondary microstrip lines 12, four first primary stubs 13, four first secondary stubs 14, and four first resonators 15. The first primary microstrip line 11 is X-shaped and has a central intersection 111 that can function as a feed point. The first primary microstrip line 11 has four sections 112 each extending from the central intersection 111 toward one of the four corners of the first layout area 31. In addition, each section 112 has an end point 113 that is located away from the central intersection 111 and is substantially located at the corresponding corner of the first layout area 31. In certain embodiments, each two adjacent sections 112 are perpendicular to each other. However, the present disclosure is not limited thereto.

With continued reference to FIG. 1 and FIG. 2, each first secondary microstrip line 12 is substantially in the shape of a straight line, has one end connected to a corresponding end point 113 of the first primary microstrip line 11 and an opposite end (hereinafter referred to as the second end), and extends along an edge of the first layout area 31 to the second end. The first secondary microstrip lines 12 extend along different directions. That is, each two adjacent first secondary microstrip lines 12 extend in a configuration that the second ends of each two adjacent first secondary microstrip lines 12 do not approach each other. As a hypothetical extension line starting from each of the two ends of each first secondary microstrip line 12 along the direction of the first secondary microstrip line 12 corresponds to a section 112, the two ends of each first secondary microstrip line 12 correspond to two sections 112, respectively, and each first secondary microstrip line 12 and the two sections 112 corresponding to the first secondary microstrip line 12 form a first surrounded space 110. More specifically, the first radiator 1 can form four first surrounded spaces 110, and each first surrounded space 110 is substantially triangular. It should be pointed out that the configuration of each first surrounded space 110 is formed by a hypothetical extension line corresponding to a first secondary microstrip line 12 and hypothetical extension lines corresponding to the two corresponding sections 112, respectively, and is not a surrounded configuration formed entirely by actual microstrip lines. Therefore, even when a first secondary microstrip line 12 has only one end connected with the end point 113 of one of the two corresponding sections 112 such that the resulting triangle is not a closed one, the generally enclosed triangular area is still defined as one of the first surrounded spaces 110 referred to herein.

With continued reference to FIG. 1 and FIG. 2, each first primary stub 13 extends from one section 112 of the first primary microstrip line 11, and the first primary stubs 13 are located in different first surrounded spaces 110. In certain embodiments, an extending direction of a first primary stub 13 is perpendicular to an extending direction of the section 112 where the first primary stub 13 is connected. Generally, a stub is a relatively shorter microstrip line segment used to adjust the resonance frequency of the antenna. Therefore, the length of a first primary stub 13 can be, for example but not limited to, substantially one fourth of the wavelength corresponding to the resonance frequency (5G or 6G) in order to create the required resonance current path. Each first secondary stub 14 can extend from one of the first secondary microstrip lines 12, and the first secondary stubs 14 are located in different first surrounded spaces 110. In certain embodiments, an extending direction of a first secondary stub 14 is perpendicular to an extending direction of the first secondary microstrip line 12 where the first secondary stub 14 is connected, and the length of the first secondary stub 14 can be, for example but not limited to, substantially one fourth of the wavelength corresponding to the resonance frequency (5G or 6G). Moreover, the first secondary stub 14 and the first primary stub 13 that are in the same first surrounded space 110 do not contact each other. Each first resonator 15 has an octagonal shape, and the first resonators 15 are provided at different sections 112 of the first primary microstrip line 11. Each first resonator 15 is located between the end point 113 of the section 112 where the first resonator 15 is provided and the first primary stub 13 extending from that section 112. The first resonators 15 are configured to regulate the surface current distribution and impedance matching of the first radiator 1 so as to improve the omni-directional radiation mode of the multi-band antenna structure A.

In certain embodiments, with continued reference to FIG. 1 and FIG. 2, the second radiator 2 and the first radiator 1 are structurally symmetric, and the second radiator 2 can also be integrally formed by metal microstrip lines and can be divided into a second primary microstrip line 21, four second secondary microstrip lines 22, four second primary stubs 23, four second secondary stubs 24, and four second resonators 25. The second primary microstrip line 21 is X-shaped and has a central intersection 211 that can function as a grounding point. The central intersection 211 corresponds in position to the central intersection 111 of the first radiator 1. The second primary microstrip line 21 has four sections 212 each extending from the central intersection 211 of the second radiator 2 toward one of the four corners of the second layout area 32. In addition, each section 212 has an end point 213 that is located away from the central intersection 211 and substantially located at the corresponding corner of the second layout area 32. In certain embodiments, each two adjacent sections 212 are perpendicular to each other. However, the present disclosure is not limited thereto.

With continued reference to FIG. 1 and FIG. 2, each second secondary microstrip line 22 is substantially in the shape of a straight line, has one end connected to a corresponding end point 213 of the second primary microstrip line 21 and an opposite end (hereinafter referred to as the second end). Each second secondary microstrip line 22 extends along an edge of the second layout area 32 to the second end. The second secondary microstrip lines 22 extend in different directions. That is, each two adjacent second secondary microstrip lines 22 extend in a configuration that the second ends of each two adjacent second secondary microstrip lines 22 do not approach each other. As a hypothetical extension line starting from each of the two ends of each second secondary microstrip line 22 along the direction of the second secondary microstrip line 22 corresponds to a section 212, the two ends of each second secondary microstrip line 22 correspond to two sections 212, respectively, and each second secondary microstrip line 22 and the two sections 212 corresponding to the first secondary microstrip line 22 form a second surrounded space 210. More specifically, the second radiator 2 can form four second surrounded spaces 210, and each second surrounded space 210 is substantially triangular. It should be pointed out that the configuration of each second surrounded space 210 is formed by a hypothetical extension line corresponding to a second secondary microstrip line 22 and hypothetical extension lines corresponding to the two corresponding sections 212, respectively, and is not a surrounded configuration formed entirely by actual microstrip lines. Therefore, even when a second secondary microstrip line 22 has only one end connected with the end point 213 of one of the two corresponding sections 212 such that the resulting triangle is not a closed one, the generally enclosed triangular area is still defined as one of the second surrounded spaces 210 referred to herein.

With continued reference to FIG. 1 and FIG. 2, each second primary stub 23 extends from one section 212 of the second primary microstrip line 21, and the second primary stubs 23 are located in different second surrounded spaces 210. In certain embodiments, an extending direction of a second primary stub 23 is perpendicular to an extending direction of the section 212 where the second primary stub 23 is connected, and the length of a second primary stub 23 can be, for example but not limited to, substantially one fourth of the wavelength corresponding to the resonance frequency. Each second secondary stub 24 can extend from one of the second secondary microstrip lines 22, and the second secondary stubs 24 are located in different second surrounded spaces 210. In certain embodiments, an extending direction of a second secondary stub 24 is perpendicular to an extending direction of the second secondary microstrip line 22 where the second secondary stub 24 is connected, and the length of the second secondary stub 24 can be, for example but not limited to, substantially one fourth of the wavelength corresponding to the resonance frequency. Moreover, the second secondary stub 24 and the second primary stub 23 that are in the same second surrounded space 210 do not contact each other. Each second resonator 25 has an octagonal shape, and the second resonators 25 are provided at different sections 212 of the second primary microstrip line 21. Each second resonator 25 is located between the end point 213 of the section 212 where the second resonator 25 is provided and the second primary stub 23 extending from that section 212. The length of a second resonator 25 along the extending direction of the corresponding section 212 is greater than the length of a corresponding first resonator 15 along the extending direction of the corresponding section 112.

With continued reference to FIG. 1 and FIG. 2, the multi-band antenna structure A is a multi-band (e.g., three-band) single-feed structure, so when applied to a piece of wireless equipment, it can reduce the number of the antennas required by the wireless equipment and thus effectively reduce the overall volume of the wireless equipment, resulting in a reduction in overall cost and simplification of the assembly process. In certain embodiments, for example, the X-axis, Y-axis, and Z-axis dimensions of the multi-band antenna structure A can be 0.3λ, 0.3λ, and 0.006λ, respectively, when calculated based on the lowest frequency band of 2.4 GHz, and such dimensions are suitable for various types of wireless equipment. The aforesaid X axis, Y axis, and Z axis are three axes that are perpendicular to one another to define the spatial configuration of a component. Reference is also made to the results of S-parameters of the multi-band antenna structure A show in FIG. 3 as well as to Table 1 as follows.

TABLE 1

| | |
|---|---|
| Frequency (MHz) | 2400-2500 and 5150-7125 |
| Return Loss (dB) | >10 |
| Peak Gain (dBi) | 2450 MHz: 0.35 |
| | 5500 MHz: 0.55 |
| | 6500 MHz: 0.93 |
| Efficiency (%) | >60% |

Figure 3:
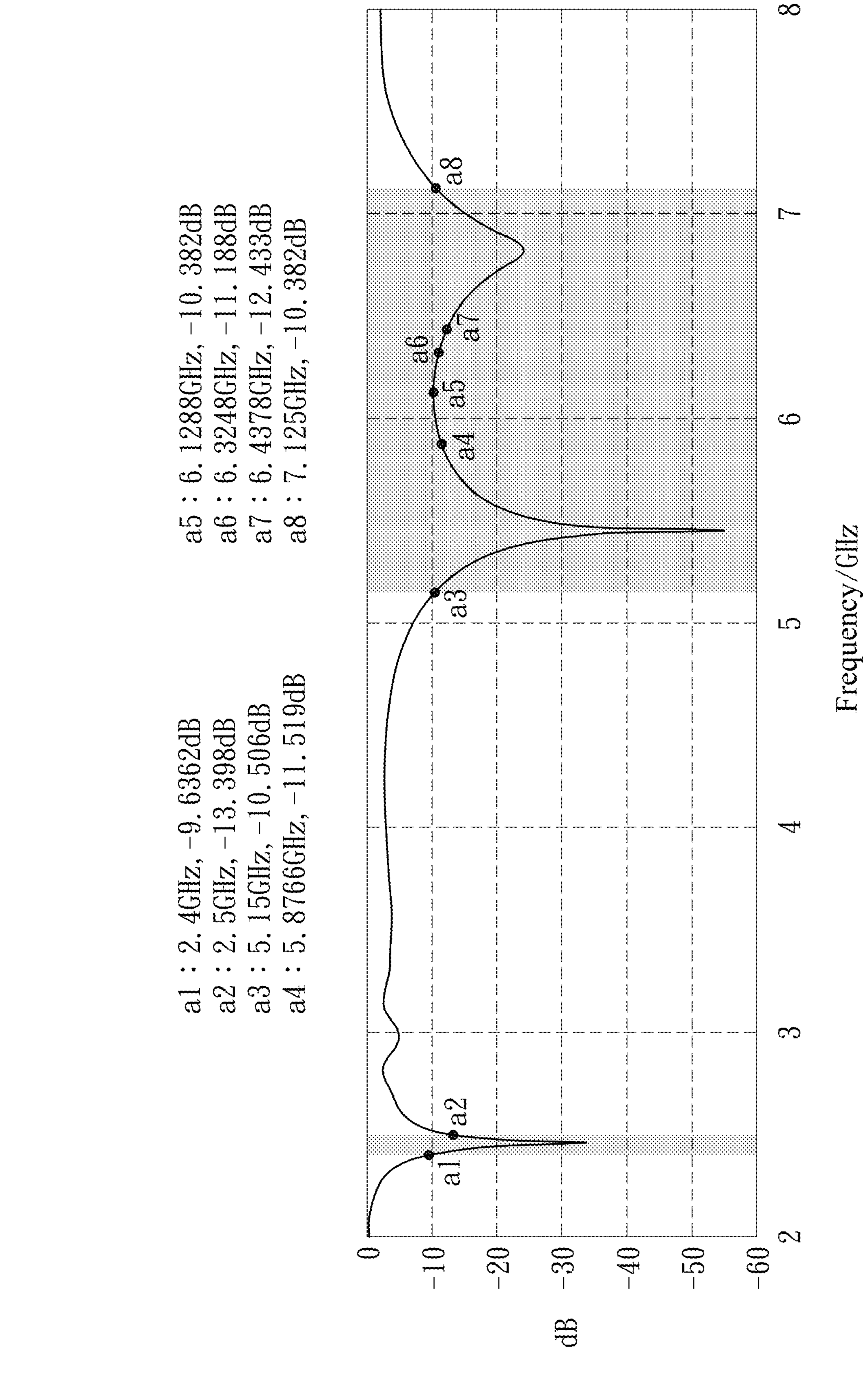
FIG. 3 shows the results of S-parameters of the antenna structure according to certain embodiments in the present disclosure.
Figure 4A:
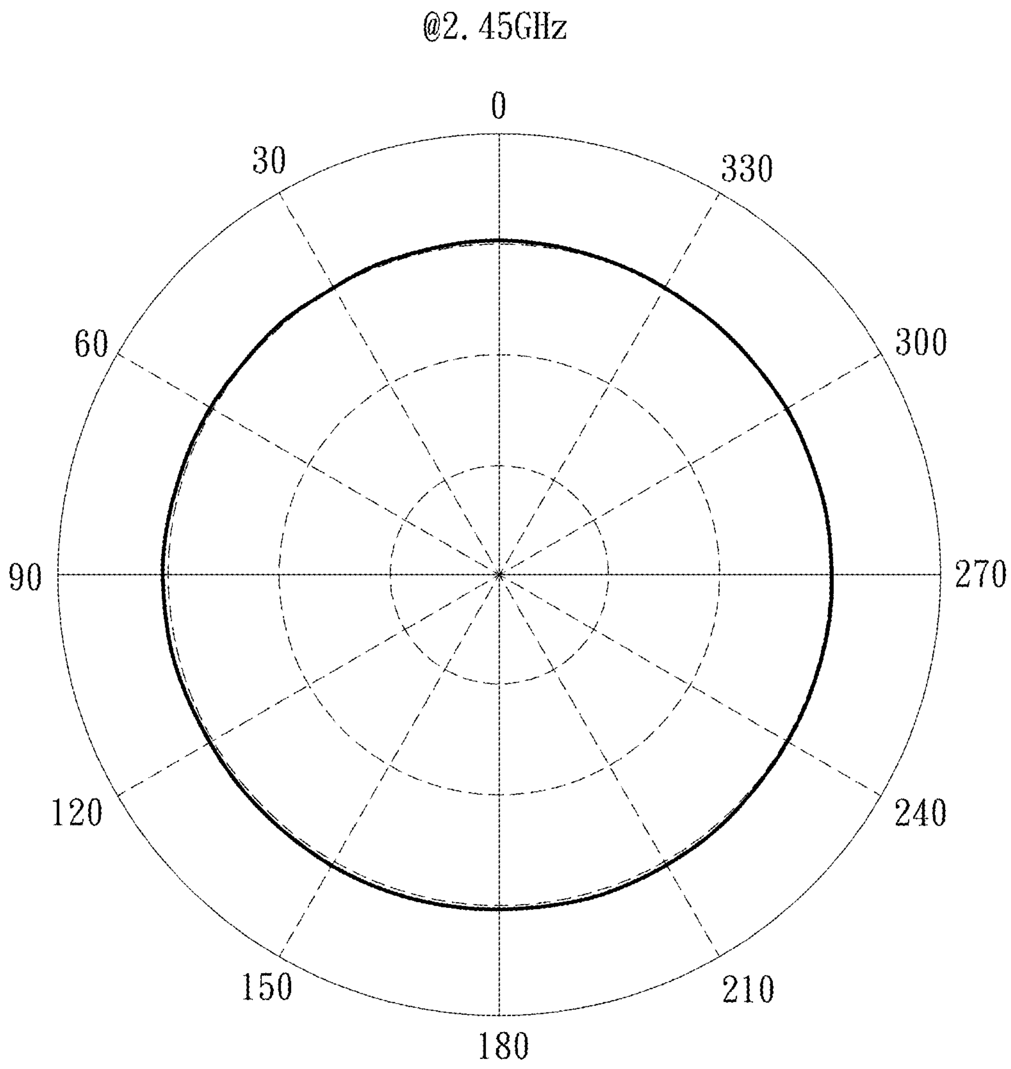
FIG. 4A shows the radiation pattern of the antenna structure at the frequency of 2.45 GHz according to certain embodiments in the present disclosure.
Figure 4B:
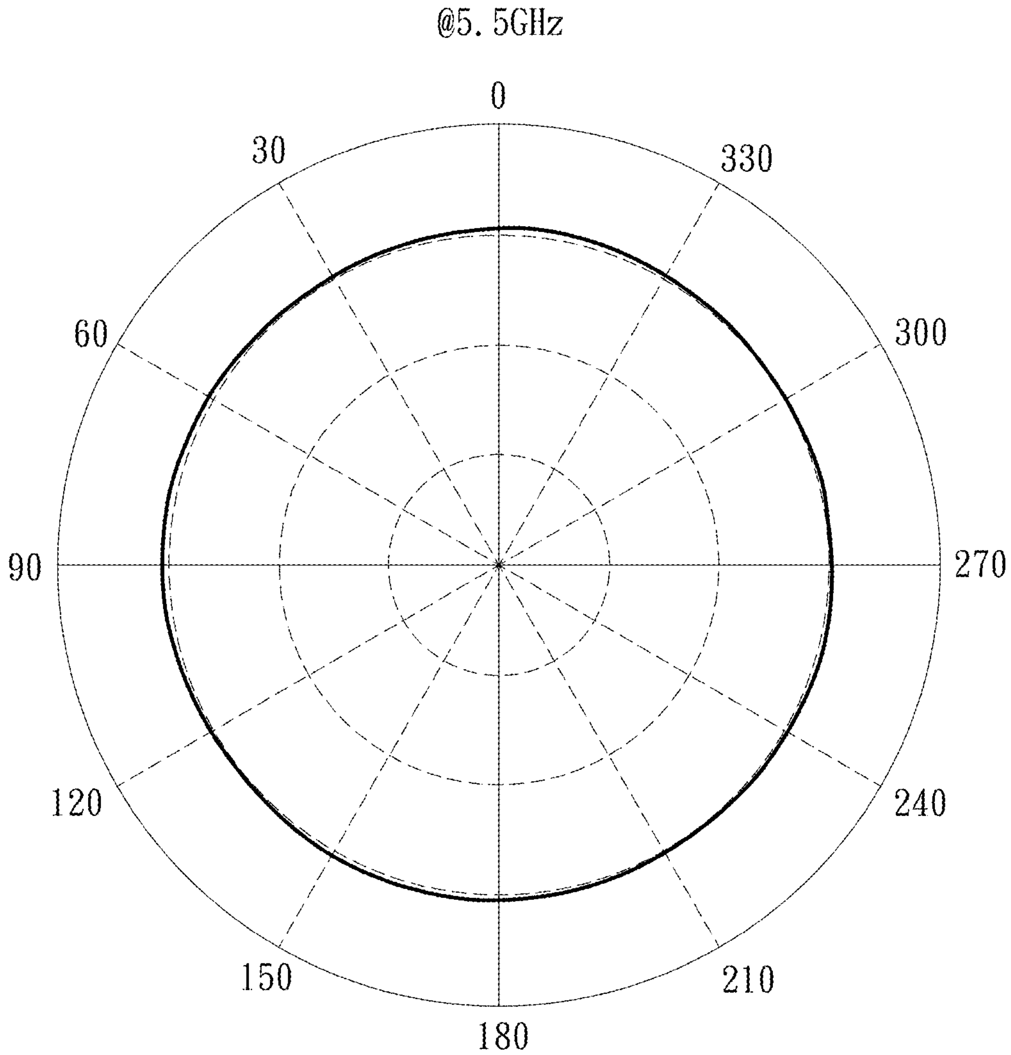
FIG. 4B shows the radiation pattern of the antenna structure at the frequency of 5.5 GHz according to certain embodiments in the present disclosure.
Figure 4C:
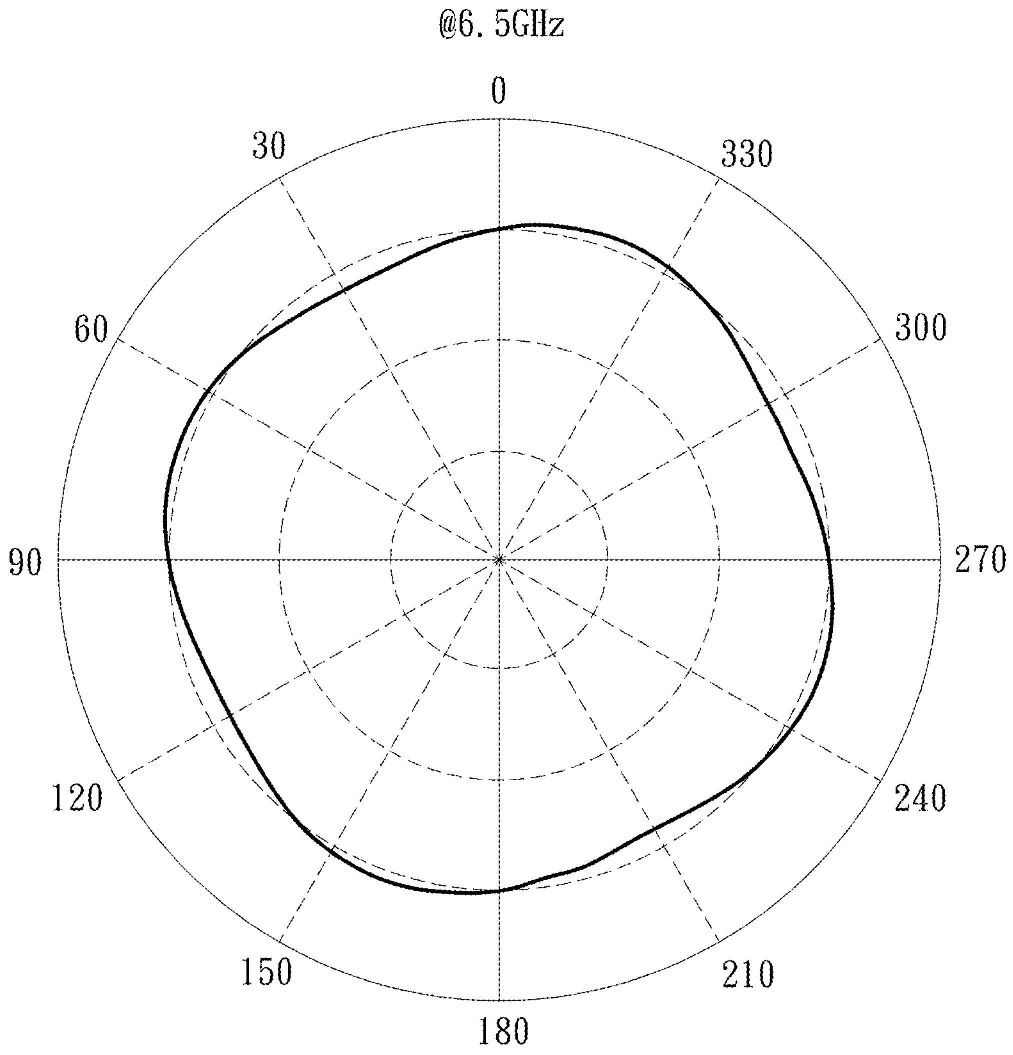
FIG. 4C shows the radiation pattern of the antenna structure at the frequency of 6.5 GHz according to certain embodiments in the present disclosure.

Referring to FIG. 3 in conjunction with FIG. 1 and FIG. 2, the multi-band antenna structure A has a resonant mode (more particularly a narrow-band high-efficiency radiation point) at the operating frequency of 2.4 GHz, and has a wide-band resonant mode having a bandwidth of approximately 32% at the operating frequencies of 5 GHz and 6 GHZ, with the main return loss in the modes exceeding 10 dB. Also, referring to FIG. 4A, FIG. 4B, and FIG. 4C for the horizontal radiation patterns of the multi-band antenna structure A at the operating frequencies of 2.45 GHZ, 5.5 GHZ, and 6.5 GHz respectively, all the radiation patterns show omnidirectionality. It can be known from the above that the multi-band antenna structure A has good performance in the 2.4 GHz, 5 GHZ, and 6 GHz frequency bands, has relatively wide band coverage in the 5 GHz and 6 GHz frequency bands, and is therefore ideal for wireless equipment that is required to work in multiple bands.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A horizontally polarized omnidirectional multi-band antenna structure, comprising:

a substrate, wherein one side of the substrate has a first layout area having a square shape or a substantially square shape, and the other side of the substrate has a second layout area corresponding in position to the first layout area;

a first radiator disposed on the substrate, located in the first layout area, and comprising:

a first primary microstrip line that is X-shaped and has four sections and a central intersection configured to be a feed point, wherein each of the four sections extends from the central intersection toward one of four corners of the first layout area, and has an end point that is located away from the central intersection and is substantially located at a corresponding corner of the first layout area;

four first secondary microstrip lines, each having a first end connected to a corresponding end point of the first primary microstrip line, extending along an edge of the first layout area to a second end opposite to the first end, and forming a first surrounded space with two of the four sections that correspond to the first end and the second end, respectively, wherein the first secondary microstrip lines extend along different directions;

four first primary stubs, each extending from one of the four sections of the first primary microstrip line, wherein the first primary stubs are located in different first surrounded spaces formed by the four first secondary microstrip lines and the four sections;

four first secondary stubs located in the different first surrounded spaces formed by the four first secondary microstrip lines and the four sections, wherein each of the four first secondary stubs extends from one of the first secondary microstrip lines and is in the same one of the first surrounded spaces with a corresponding one of the first primary stubs without contacting the corresponding first primary stub; and four first resonators provided at the four sections of the first primary microstrip line, respectively, wherein each of the four first resonators has an octagonal shape, and is located between an end point of a corresponding one of the sections where the first resonator is provided and a corresponding one of the first primary stubs that extends from the corresponding section; and a second radiator disposed on the substrate, located in the second layout area, structurally symmetric to the first radiator, and comprising:

a second primary microstrip line that is X-shaped and has four sections and a central intersection configured to be a grounding point, wherein each of the four sections of the second primary microstrip line extends from the central intersection of the second primary microstrip line toward one of four corners of the second layout area, and has an end point that is located away from the central intersection of the second primary microstrip line and is substantially located at a corresponding corner of the second layout area, and the central intersection of the second primary microstrip line corresponds in position to the central intersection of the first primary microstrip line;

four second secondary microstrip lines, each having a first end connected to a corresponding end point of the second primary microstrip line, extending along an edge of the second layout area to a second end opposite to the first end of the second secondary microstrip line, and forming a second surrounded space with two of the four sections of the second primary microstrip line that correspond to the first end and the second end of the second secondary microstrip line, respectively, wherein the second secondary microstrip lines extend along different directions;

four second primary stubs, each extending from one of the four sections of the second primary microstrip line, wherein the second primary stubs are located in different second surrounded spaces formed by the four second secondary microstrip lines and the four sections of the second primary microstrip line;

four second secondary stubs located in the different second surrounded spaces formed by the four second secondary microstrip lines and the four sections of the second primary microstrip line, wherein each of the four second secondary stubs extends from one of the second secondary microstrip lines and is in the same one of the second surrounded spaces with a corresponding one of the second primary stubs without contacting the corresponding second primary stub; and four second resonators provided at the four sections of the second primary microstrip line, respectively, wherein each of the four second resonators has an octagonal shape, and is located between an end point of a corresponding one of the sections of the second primary microstrip line where the second resonator is provided and a corresponding one of the second primary stubs that extends from the corresponding section of the second primary microstrip line.

2. The horizontally polarized omnidirectional multi-band antenna structure according to claim 1, wherein each of the first layout area and the second layout area has a square shape or a substantially square shape.

3. The horizontally polarized omnidirectional multi-band antenna structure according to claim 1, wherein a projection of the first layout area on the other side of the substrate that has the second layout area and the second layout area coincide or substantially coincide.

4. The horizontally polarized omnidirectional multi-band antenna structure according to claim 1, wherein each two adjacent sections of the four sections of the first primary microstrip line are perpendicular to each other.

5. The horizontally polarized omnidirectional multi-band antenna structure according to claim 1, wherein an extending direction of each of the first primary stubs is perpendicular to an extending direction of a corresponding one of the sections of the first primary microstrip line where the first primary stub is connected.

6. The horizontally polarized omnidirectional multi-band antenna structure according to claim 1, wherein a length of each of the second resonators along an extending direction of one of the sections of the second primary microstrip line that corresponds to the second resonator is greater than a length of one of the first resonators that corresponds to the second resonator along an extending direction of one of the sections of the first primary microstrip line that corresponds to the first resonator.

7. The horizontally polarized omnidirectional multi-band antenna structure according to claim 1, wherein the horizontally polarized omnidirectional multi-band antenna structure operates at 2G, 5G, and 6G frequency bands.

8. The horizontally polarized omnidirectional multi-band antenna structure according to claim 1, wherein X-axis, Y-axis, and Z-axis dimensions of the horizontally polarized omnidirectional multi-band antenna structure are $0.3\lambda$, $0.3\lambda$, and $0.006\lambda$, respectively.

* * * * *